United States Patent [19]

Wilson

[11] 3,996,789
[45] Dec. 14, 1976

[54] LEAK DETECTION

[75] Inventor: David Robert Wilson, Stockton-On-Tees, England

[73] Assignee: Imperial Chemical Industries Limited, London, England

[22] Filed: Mar. 28, 1975

[21] Appl. No.: 562,820

Related U.S. Application Data

[63] Continuation of Ser. No. 356,165, May 1, 1973, abandoned.

[30] Foreign Application Priority Data

May 10, 1972 United Kingdom ............ 21800/72
Feb. 7, 1973 United Kingdom .............. 6033/73

[52] U.S. Cl. ............................. 73/40.5 R; 73/46; 285/93
[51] Int. Cl.² ......................................... G01M 3/14
[58] Field of Search .............. 73/40, 40.5, 46, 48; 138/97; 116/114 P; 285/93

[56] References Cited

UNITED STATES PATENTS

| | | | |
|---|---|---|---|
| 1,270,073 | 6/1918 | Thiem | 73/48 |
| 1,384,888 | 7/1921 | Carlisle | 73/48 |
| 1,388,443 | 8/1921 | Stewart | 73/48 |
| 2,766,614 | 10/1956 | Cook | 73/46 |
| 3,173,450 | 3/1965 | Halterman | 138/97 |
| 3,260,280 | 7/1966 | Buczala | 138/97 |

FOREIGN PATENTS OR APPLICATIONS 812,848  9/1951  Germany .............................. 73/46

Primary Examiner—S. Clement Swisher
Assistant Examiner—Denis E. Corr
Attorney, Agent, or Firm—Cushman, Darby & Cushman

[57] ABSTRACT

Apparatus is tested for leaks by enclosing it by an enclosure which includes a flexible bag in its walls, the bag passing through its mouth when the pressure in the enclosure changes as a result of a leak, or comprises a member which flexes as a result of sorption of leaking materials.

9 Claims, 1 Drawing Figure

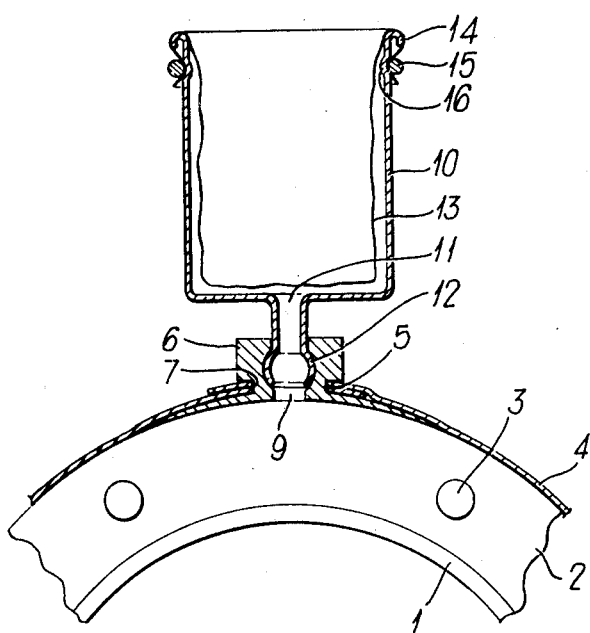

LEAK DETECTION

This is a continuation, division, of application Ser. No. 356,165 filed May 1,1973 now abandoned THIS INVENTION relates to leak detection.

The invention comprises a method of testing apparatus for leaks which comprises enclosing the potential leak with a barrier separating the enclosure from the atmosphere, the barrier comprising (a) a flexible bag protruding from the surrounding portion of the barrier in the direction subject to greater pressure when a leak occurs, the bag being capable on leakage, for example ingress or egress of gas into or from the enclosure of passing to the opposite side of the surrounding portion of the barrier or (b) comprising a flexible member which flexes as a result of sorption of leaking material. When a leak occurs a said bag 'passes through its mouth' i.e. "turns inside out" and the fact that a leak has occurred can be recognized visually.

The said flexible member which flexes as a result of sorption of leaking materials may be a tube communicating both with the enclosure and the atmosphere, which tube is provided with longitudinal slits in its wall at its end which communicates with the atmosphere. On passage of leaking material through the tube, sorption occurs and the sections of the tube wall between the slits tend to bend outwards, and thereby an effect similar to the opening of a flower may be obtained. Preferably 3 to 20 such slits spaced around the tube are provided, but for example two slits close together will enable the tongue of tube wall between them to flex outwards on exposure to leaking materials. The use of a flexible member which flexes as a result of sorption of leaking materials is appropriate for testing for leaks of solvents which are liquid at ambient temperatures and pressures, for example cyclohexane and aromatic hydrocarbons, many alcohols and ketones. The flexible member is preferably constructed of elastomers, for example, natural or synthetic rubber or silicone rubber.

The invention also comprises a substantially rigid enclosure to be tested for leakage for example ingress or egress of gas which comprises a port leading from the enclosure to the atmosphere, but closed by a flexible bag having its mouth gas impermeably secured to the port and capable, on leaks into or from the enclosure, of passing through the port, or a flexible member as aforesaid in the port.

Transient leaks may be detected when a flexible bag is used since the bag having passed through its mouth tends to remain outside the port unless the pressure within the enclosure alters in the opposite sense, the bag merely becoming limp.

The invention is applicable to testing joints between flanged pipes for leakage. For this application the enclosure preferably includes an annular space extending to the facing parts of the flanges. An enclosure around such joints may be provided by passing a sealing strip (which may be centrally grooved to provide the annular space if necessary) around the flanges to enclose the joint. The port to which the bag is sealed may be made in the sealing strip or the enclosure may communicate, for example by means of a passage through the sealing strip, with a device according to the invention which may be, for example, a receptacle having an open face (which constitutes the port) which is closed with a flexible bag secured by its mouth to the port. Thus, it defines with the receptacle a zone of variable volume. Leakage into or from the enclosure may be detected by passage of the bag through the open face.

The receptacle may suitably be cylindrical with one end open and one end closed. The receptacle may communicate with the enclosure by a tube (which may be a push-fit tube) projecting from its closed end. The bag may be a diaphragm of, for example polyvinyl chloride or a rubber. Its mouth may be turned back over the mouth of the cylinder and secured, for example by adhesive or by pressure exerted from a resilient O-ring against the outside of the cylinder. In the latter case a depression is preferably made round the outer periphery of the cylinder into which the O-ring may fit and thus be retained in position.

The invention also provides means for enclosing a joint between two flanged pipes which comprises a resilient gas impermeable strip provided at each end with a hole and a joining piece of material which is preferably resilient and which comprises a stud adapted to be passed through both holes of the resilient strip thus holding them in position to form a circlet around a flanged pipe joint, the stud having chamfered abutments extending from its base and shaped to fill the space between the resilient strip and the tube flanges near to the stud, the stud being provided with an axial hole passing through it, and being formed with an enlarged head spaced from the abutments. A flexible bag adapted to lie in or through the hole may be secured by its mouth to close the hole or to a liner for the hole to close it. Alternatively the hole may be used as a sample point for any other detector, for example, comprising a flexible member as aforesaid.

The sensitivity of the method to leaks may be varied by altering the flexibility of the bag by adjusting its dimensions, particularly the thickness of its wall or its length or mouth size or by altering its material of construction. The method may be made insensitive to slow leaks by providing for slow leakage from or to the enclosure as the case may be.

The invention will now be described with reference to the drawings which show a transverse cross-section of a joint between two flanged tubes and devices according to the invention.

A flanged tube 1 provided with a flange 2 secured to an abutting similarly flanged tube by bolts 3 is surrounded by an extruded rubber strip 4 which has holes 5 cut at each end. The ends overlap and are secured together by a rubber stud 6 having an enlarged head, the neck 7 of which engages the ends of the strip 4. The stud is provided with chamfered abutments 8 which extend between the ends of the joining strip 4 and the flanges to provide a seal. An axial port 9 is provided through the stud 6. A cylinder 10 which is closed at the bottom but is provided with a gas inlet port 11 defined by a push-fit tube 12 inserted into the port 9 through stud 6 is lined with a shaped rubber diaphragm 13 which constitutes a bag. The mouth of the bag is stretched round the upper lip 14 of the cylinder 10 and secured to the outside of the cylinder 10 by pressure exerted by an O-ring 15 which is retained in position by circumferential depression 16 under the lip 14 of the cylinder 10.

Upon leakage of a gas through the joint between the flanged pipes a positive pressure is created which serves to blow diaphragm 13 out of the cylinder 10 thus indicating the existence of a leak. If a high pressure is encountered the diaphragm may be burst or be blown off or the rubber strip 4 lifts. If a transient pressure is encountered the diaphragm may remain outside the cylinder but become limp.

In a modification of the above procedure the development of a negative pressure within the enclosure may be detected by positioning the bag outside the cylinder 10. On development of a negative pressure the bag is sucked into the cylinder 10.

The base of the cylinder 10 may be conical in order more conveniently to hold the bag and to confer additional strength when the push-fit tube 12 is pushed into stud 6. If the bag 13 is sufficiently robust to resist cutting when it is turned back over the lip 14 of the cylinder 10, it is preferred for manufacturing convenience not to turn the lip 14 over as shown but to leave it as a straight end.

In a further form of the invention, the cylinder with the push fit tube (10, 12) diaphragm 13 and O-ring 15 are replaced by a cylindrical silicone rubber tube which is open at both ends and is inserted at one end into stud 6 and has eight regularly spaced longitudinal slits at the other end.

On leakage of a material which is sorbed by the silicone rubber tube its outer end opens, the portions of tube between the slits splaying outwards away from one another.

I claim:

1. Means for enclosing a joint between two flanged pipes so that said joint can be tested for leaks which comprises a resilient gas impermeable strip provided at each end with a hole and a joining piece which comprises a stud adapted to be passed through both holes of the resilient strip to hold said strip in position thus forming a circulet around the flanged pipe joint, said stud forming an axial opening therethrough to said joint thereby providing a testing port, said stud having chamfered abutments extending from its base and shaped to fill the space between the resilient strip and the pipe flanges near to the stud being formed with an enlarged head spaced from the abutments.

2. A stud for holding together the ends of a resilient gas impermeable strip which is provided at each end with a hole, to form an enclosure around a flanged pipe joint which stud is formed with
   a. an enlarged head,
   b. two long thin wedge-like sealing abutments which extend in opposite directions from the base of the stud and are spaced from the head, the underside of the abutments being adapted to conform to the outer edges of flanges of the flanged pipe joint to complete the enclosure under the ends of said strip and
   c. an axial hole through the stud to constitute a means of passage of leaking materials to or from the enclosure.

3. An improved leak detector for detecting leaks from joints between two pipes comprising a resilient gas impermeable strip provided with holes, stud means adapted to fit through at least two of said holes for securing said strip around said joint, said stud means having chamfered abutments extending from the portion of said stud adjacent said joint so as to pass along a portion of said joint beneath said strip, said stud means further including an axial opening extending therethrough, tube means for indicating leaks having one end adapted to fit within said axial opening in said stud means and having an opposite end adapted to receive an invertible flexible bag, said opposite end being closed by said invertible flexible bag so that said bag is inverted upon the occurrence of a leak.

4. An improved leak detector as claimed in claim 3 wherein said tube means is a cylinder and said end adapted to fit within said opening comprises a push fit projection.

5. An improved leak detector as claimed in claim 3 wherein said bag is turned back over the mouth of said opposite end of said tube means and secured thereon by an adhesive.

6. An improved leak detector as claimed in claim 3 wherein said bag is turned back over the mouth of said opposite end of said tube means and secured thereon by pressure exerted from a resilient O-ring against the exterior of said tube means.

7. A method of testing an enclosure for leaks comprising the steps of:
   surrounding the area of potential leakage with a flexible sealing strip,
   securing said strip while simultaneously forming a port therethrough at the point said strip is secured,
   sealing said strip adjacent said port in said area of potential leakage,
   closing said port with invertible bag means and adjusting said bag so that upon the occurrence of a leak said bag will be inverted from its original adjustment thereby providing a visual indication of said leak.

8. An improved leak detector for detecting leaks from flanged joints between two pipes comprising a resilient gas impermeable strip provided with holes, stud means adapted to fit through at least two of said holes for securing said strip around said joint, said stud means having chamfered abutments extending from the portion of said stud adjacent said joints and shaped to fill the space between the resilient strip and the flanges of said joint near to said stud means, said stud means further including an axial opening extending therethrough, indication means associated with said stud means for indicating leaks, said indicating means comprising a flexible member which visibly flexes as a result of absorption of leaking material.

9. An improved leak detector for detecting leaks as claimed in claim 8 wherein said flexible member further comprises a tube communicating both with said axial opening in said stud means and the atmosphere, said tube being provided with a plurality of longitudinal splits in its wall at the end which communicates with the atmosphere so that on passage of leaking material through said tube sorption occurs causing said slits to bend.

* * * * *